July 9, 1968    F. W. LINDBLOM    3,391,976

AUXILIARY NOSEPIECE FOR SPECTACLE FRAMES

Filed June 29, 1965

INVENTOR.
FRANK W. LINDBLOM
BY
*Barlow & Barlow*
ATTORNEYS

United States Patent Office 3,391,976
Patented July 9, 1968

3,391,976
AUXILIARY NOSEPIECE FOR
SPECTACLE FRAMES
Frank W. Lindblom, Warwick, R.I., assignor to Welsh
Manufacturing Company, a corporation of Rhode
Island
Filed June 29, 1965, Ser. No. 468,085
2 Claims. (Cl. 351—130)

This invention relates to auxiliary nosepieces for spectacle frames which nosepieces are adapted to be detachably secured to the inner marginal portions of the lens frames at a position adjacent the bridge portion of the frame.

Spectacles have been made for many years embodying the general construction of a bridge joining the upper portion of a pair of lens frames together with a pair of nose pads, the mountings for which protrude rearwardly from locations adjacent the bridge. Nose pads have been the sole supporting structure for spectacle frames, and in order to space the nose pads varying distances apart to accommodate various sizes of noses, it has been customary to provide a range of bridge sizes or lengths of bridges varying anywhere from 20 mm. to 26 mm., and this of course means that a number of frames must be stocked by a supplier, and thus in the last few years it has become popular to utilize what is known as the universal fit type of frame which embodies a combined bridge and nose pad section that is contoured to provide a fit for a number of noses over a wide size range. Such universal fit devices, while they are useful, will of course not work accurately with optical devices where the pupillary distances must be maintained but are adequate and extremely satisfactory for the industrial protective spectacles and sunglasses where no pupillary distance dimension must be maintained. Further some applications require the use of metal frame spectacles for high rigidity and strength of the frame member itself, and accordingly it is desirable to provide the universal fit feature in connection with such spectacles.

It is accordingly the main object of this invention to provide an auxiliary nose piece which can be used with existing metal frame spectacles and which may be readily attached and detached from the spectacles.

A further object of the invention is to provide a simple, economical and effective auxiliary nose piece of a lightweight material which will not detract from the physical appearance of the spectacles.

With these and other objects in view, the invention consists of certain novel features of construction as will be more fully described and particularly pointed out in the appended claims.

Figure 1:
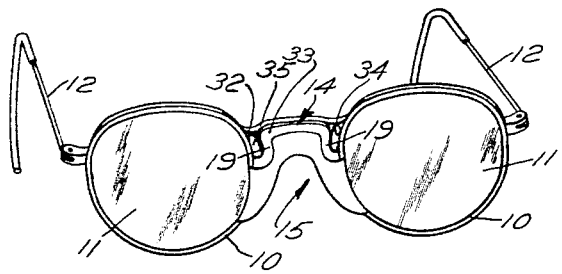
FIG. 1 is a perspective view illustrating a pair of metal frame spectacles with the auxiliary nose pad of my invention attached thereto.

The spectacle frames upon which the invention is applicable may be conventional frames of the goggle or spectacle type insofar as they include the basic parts, namely, lens rim 10 carrying lenses 11, temples 12 and a bridge structure 14 connecting the lenses together.

The invention provides an auxiliary nose piece generally designated 15 which is preferably made as a single integral unitary article that may be easily attached and detached from the frame at the bridge portion thereof. Preferably the nose piece is made of a suitable type of moldable plastic, but it may also be made of metal or any forgable materials if desired.

Referring more particularly to FIGURES 3-6, the nose piece comprises two distinct areas, an upper area or bridge portion, generally designated 16, which includes and is complemental to the bridge portion 14 of the spectacles and arm portions generally designated 17. The bridge portion 16 being designed to be complemental to the bridge 14 is formed with a recess 20 which opens from the front face of the nose piece and which is provided with a wall 21 that is adapted to abut the underside of the bridge 14. As will be noticed by referring to the drawing, the bridge 14 in the instant example is made with a pair of modified S shaped arms 19, and these modified S shaped arms are snuggly received by the wall 21 as at the section designated 22—22. Additionally, the back wall 23 of the recess 20 is arcuate and shaped to abut the rear face of the bridge 14. As will be seen particularly in FIG. 4, the wall 23 of this recess is of arcuate section in the example given, but this particular section may vary depending upon the particular configuration of the bridge 14 and the spectacles with which the auxiliary nose pad is adapted to be used.

The arm portions 17 basically depend from either end of the bridge section 16 and consist principally of pad areas 25—25 which are adapted to rest on the nose. The pad areas project rearwardly from the front face of the nose piece and are formed in a contour where they blend in with the concavity at the bridge section designated by the reference numeral 26. The blending of these shapes is a technique known well to those skilled in the art and forms no particular part of this invention. Each of the arms 17 are formed with a groove 28 which is adapted to receive a lens rim 10. This groove 28, as will be seen particularly in FIG. 4, extends into the recess area 20 of the nose piece and can be said in one way to be a continuation of this receiving concavity or recess.

Figure 2:
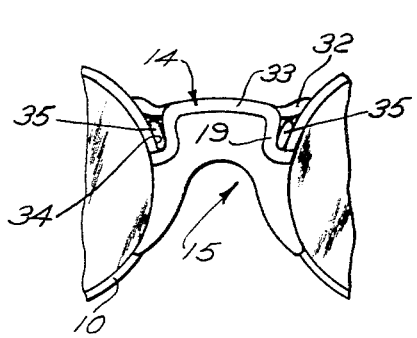
FIG. 2 is an enlarged front view showing the auxiliary nose piece in place.
Figure 3:
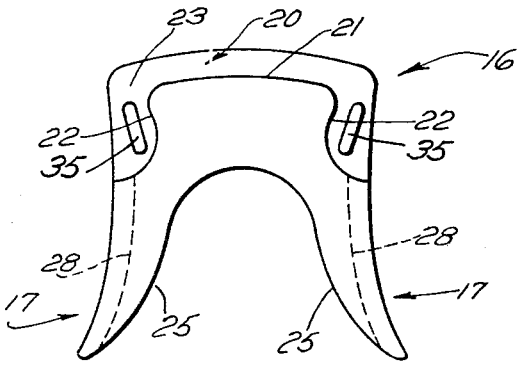
FIG. 3 is a greatly enlarged front view of the auxiliary nose piece.
Figure 4:
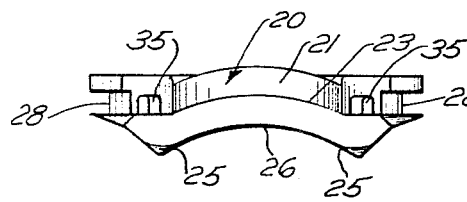
FIGS. 4 and 5 are top and bottom views respectively of the auxiliary nose pad.
Figure 5:
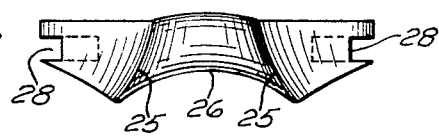
Figure 6:
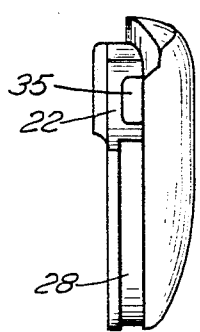
FIG. 6 is an edge view of the auxiliary nose pad.

The bridge 14 as will be noticed in FIGURES 1 and 2 also comprises an upper bar 32 which extends from one rim 10 to the other rim 10 along and conforming to the shape of the horizontal portion 33 of the bridge. An opening 34 is provided between the rim 10, the S shaped portion 19 and the bar 32 of the bridge. The nose piece has a projection raised from the recess back wall at 35 of a size and shape to enter the opening 34 and by engagement with the bar 32, the rim and the portion 19 limit the movement of the nose piece in any direction in generally the plane of the lenses.

Figure 7:
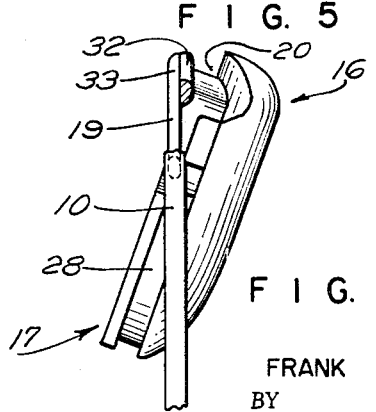
FIG. 7 is a sectional view illustrating the method of inserting the nose piece in place.

The nose piece is secured to the frame by placing the grooved portions at 28 to receive the rims 10 with the recess 20 and projection 35 back from the bridge 14 and the arms 17 inclined forwardly as in FIG. 7 and then rocking the upper part of the nose piece forwardly and the arms rearwardly so that the projections 35 enter the openings 34 and the grooves in arm 17 receive the rims 10 in their lower portions.

I claim:

1. In combination with spectacles having rigid lens frames with a bridge frame joining the lens frames, the bridge frame comprising an upper bar extending from one lens frame to the other and attached to the lens frames at its ends and legs extending from a point spaced from the ends of the bar downwardly and each attached to a lens frame at a point spaced from the point of attachment of the bar to the lens frame providing an opening between said bridge frame and each lens frame, a detachable nosepiece comprising a unitary molded member with a pair of diverging arms, said arms forming nose pads, said arms having a grooved channel on the outer side thereof of complemental shape to the lens frames and receiving the lens frames, the front face of said member having a recess with a bottom wall receiving the bridge frame bar and legs and projections from said bottom wall registering with and extending into said opening between said bridge and lens frames to lock the member in position against movement in generally the plane of the lenses.

2. The combination of claim 1 wherein the projections on said nosepiece are of the same pieces of material as the nosepiece.

No references cited.

DAVID H. RUBIN, *Primary Examiner.*

W. BROWN, *Assistant Examiner.*